(12) United States Patent
Matsumoto et al.

(10) Patent No.: US 9,819,300 B2
(45) Date of Patent: Nov. 14, 2017

(54) MACHINE LEARNING APPARATUS FOR LEARNING OPERATION CONDITIONS OF COOLING DEVICE, MOTOR CONTROL APPARATUS AND MOTOR CONTROL SYSTEM HAVING THE MACHINE LEARNING APPARATUS, AND MACHINE LEARNING METHOD

(71) Applicant: FANUC CORPORATION, Yamanashi (JP)

(72) Inventors: Yasuyuki Matsumoto, Yamanashi (JP); Yamato Mishima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/218,244

(22) Filed: Jul. 25, 2016

(65) Prior Publication Data
US 2017/0033729 A1 Feb. 2, 2017

(30) Foreign Application Priority Data

Jul. 31, 2015 (JP) ................................. 2015-152415
Jun. 29, 2016 (JP) ................................. 2016-129081

(51) Int. Cl.
*G05B 19/42* (2006.01)
*H02P 29/68* (2016.01)
(Continued)

(52) U.S. Cl.
CPC .......... *H02P 29/68* (2016.02); *G05B 13/0265* (2013.01); *H02P 29/64* (2016.02)

(58) Field of Classification Search
USPC ......... 318/568.13, 400.08, 473; 700/300, 47, 700/81
See application file for complete search history.

(56) References Cited

U.S. PATENT DOCUMENTS 5,372,015 A * 12/1994 Suzuki ................. F24F 11/0009
                                                    236/78 D
6,243,641 B1 * 6/2001 Andrews ................ G01M 15/08
                                                    123/436
(Continued)

FOREIGN PATENT DOCUMENTS

JP         05-236704 A      9/1993
JP       2000-350413 A     12/2000
(Continued)

*Primary Examiner* — Jorge L Carrasquillo
(74) *Attorney, Agent, or Firm* — Hauptman Ham, LLP

(57) ABSTRACT

A machine learning apparatus according to the present invention, which learns the operation conditions of a cooling device for cooling a motor or a motor control apparatus, includes a state observer for observing a state variable including at least one of temperature data of the motor and the motor control apparatus at a specific position during operation of the cooling device; a determination data acquisition unit for acquiring determination data that determines a margin of acceptable value of a loss in each of the motor, the motor control apparatus, and the cooling device and a margin of acceptable value of the temperature of each of the motor and the motor control apparatus at the specific position; and a learner for learning the operation conditions of the cooling device in accordance with a training data set constituted of a combination of the state variable and the determination data.

16 Claims, 8 Drawing Sheets

(51) Int. Cl.
    *H02P 29/64*          (2016.01)
    *G05B 13/02*         (2006.01)

(56) References Cited

U.S. PATENT DOCUMENTS

| | | | | |
|---|---|---|---|---|
| 2002/0099482 A1* | 7/2002 | Reese, II | ................ | F01P 11/14 |
| | | | | 701/31.4 |
| 2015/0149109 A1* | 5/2015 | Kim | ...................... | G01K 7/427 |
| | | | | 702/130 |
| 2015/0161020 A1* | 6/2015 | Matsuoka | ............... | G01F 11/00 |
| | | | | 702/189 |

FOREIGN PATENT DOCUMENTS

| | | |
|---|---|---|
| JP | 2007-100967 A | 4/2007 |
| JP | 2014-236622 A | 12/2014 |

\* cited by examiner

MACHINE LEARNING APPARATUS FOR LEARNING OPERATION CONDITIONS OF COOLING DEVICE, MOTOR CONTROL APPARATUS AND MOTOR CONTROL SYSTEM HAVING THE MACHINE LEARNING APPARATUS, AND MACHINE LEARNING METHOD

RELATED APPLICATIONS

The present application claims priority to Japanese Application Number 2015-152415, filed Jul. 31, 2015, and Japanese Application Number 2016-129081, filed Jun. 29, 2016, the disclosures of which are hereby incorporated by reference herein in their entireties.

BACKGROUND OF THE INVENTION

1. Field of the Invention

The present invention relates to a machine learning apparatus, a motor control apparatus, a motor control system, and a machine learning method, and specifically relates to a machine learning apparatus for learning operation conditions of a cooling device, a motor control apparatus and a motor control system having the machine learning apparatus, and a machine learning method.

2. Description of Related Art

The temperature of motors increases with their drives due to heat generation caused by an iron loss of a stator core and a copper loss of windings. The increase in temperature may result in a loss of the motor or damage the motor. Thus, in order to provide absorption cooling for the generated heat, a method for cooling the motor is proposed (for example, Japanese Unexamined Patent Publication (Kokai) No. 5-236704, hereinafter referred to as "patent document 1").

Also, in control apparatuses for driving the motor, a power device generates heat inside the control apparatus with a drive of the motor and an increase in temperature causes damage to the power device. Thus, in order to maintain the life of the control apparatus, a method for cooling the control apparatus is proposed.

A motor cooling device described in the patent document 1 includes a coolant supply pipe disposed inside a rotation shaft of the motor along an axial direction, coolant ejection ports that are provided opposite winding edges formed by windings wound around a stator core to eject a coolant from the coolant supply pipe to the winding edges, a pump for supplying the coolant to the coolant supply pipe, and a pump control means for varying the amount of the coolant discharged from the pump in accordance with a drive state of the motor. The motor cooling device described in the patent document 1 can efficiently cool the stator core, and therefore efficiently cool the entire motor.

However, in the conventional motor control apparatus, only the rate of operation of the cooling device is varied in accordance with the temperature of the motor. Therefore, it is difficult to reduce losses in the motor, the motor control apparatus, and the cooling device, while controlling the motor and the motor control apparatus at a regulated temperature or lower.

SUMMARY OF THE INVENTION

The present invention aims to provide a machine learning apparatus that can reduce losses in a motor, a motor control apparatus, and a cooling device while controlling the motor and the motor control apparatus at a regulated temperature or lower by machine learning, the motor control apparatus and a motor control system having the machine learning apparatus, and a machine learning method.

A machine learning apparatus according to an embodiment of the present invention, for learning an operation condition of a cooling device for cooling a motor or a motor control apparatus, includes a state observer for observing a state variable including at least one of temperature data of the motor and the motor control apparatus at a specific position during operation of the cooling device; a determination data acquisition unit for acquiring determination data that determines a margin of acceptable value of the sum total of losses in the motor, the motor control apparatus, and the cooling device and a margin of acceptable value of the temperature of each of the motor and the motor control apparatus at the specific position; and a learner for learning the operation condition of the cooling device in accordance with a training data set constituted of a combination of the state variable and the determination data.

A motor control apparatus according to the embodiment of the present invention including the above-described machine learning apparatus, further includes a decision maker for determining command values for at least one of a combination of the rotational speed and the operating time of the cooling device and a combination of the temperature and the flow rate of a coolant of the cooling device, based on a result of learning by the learner in accordance with the training data set.

A motor control system according to the embodiment of the present invention includes the above-described motor control apparatus, and a temperature detecting element for outputting the temperature data.

A machine learning method according to the embodiment of the present invention, for learning the operation condition of the cooling device for cooling the motor or the motor control apparatus, includes the steps of observing the state variable including the temperature data of each of the motor and the motor control apparatus at the specific position during operation of the cooling device; acquiring the determination data for determining a margin of acceptable value of the sum total of the losses in the motor, the motor control apparatus, and the cooling device and the margin of acceptable value of the temperature of each specific position; and learning the operation condition of the cooling device in accordance with the training data set constituted of the state variable and the determination data.

BRIEF DESCRIPTION OF THE DRAWINGS

The objects, features, and advantages of the present invention will be more apparent from the following description of an embodiment in conjunction with the attached drawings, wherein.

DETAILED DESCRIPTION OF THE INVENTION

A machine learning apparatus, a motor control apparatus, a motor control system, and a machine learning method according to the present invention will be described below with reference to the drawings.

Figure 1:
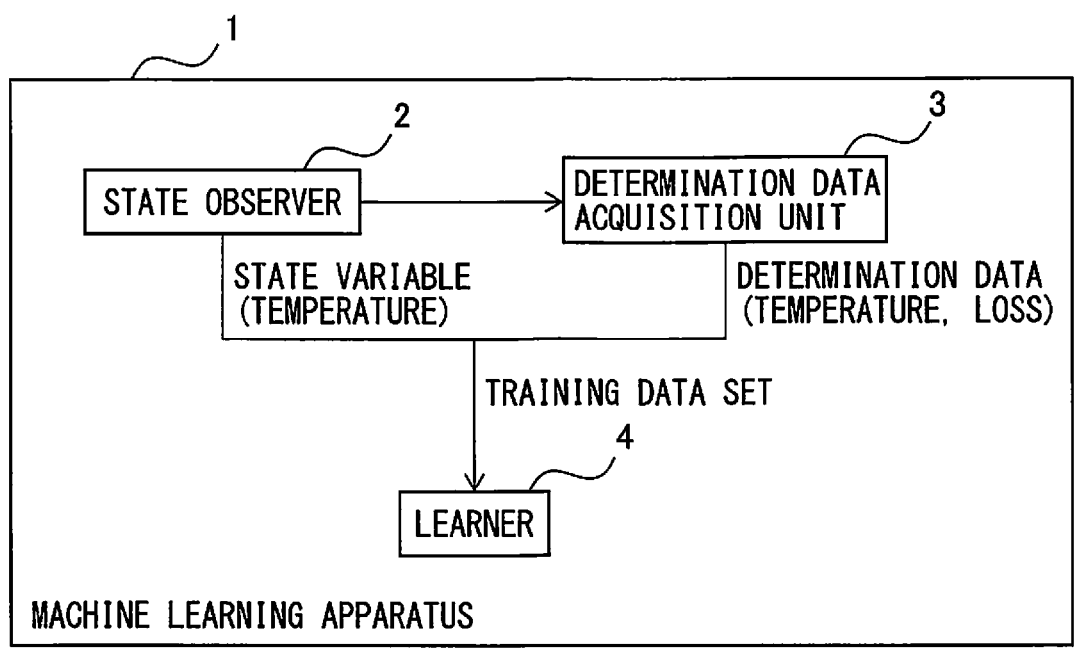
FIG. 1 is a block diagram of a machine learning apparatus according to an embodiment of the present invention.
Figure 2:
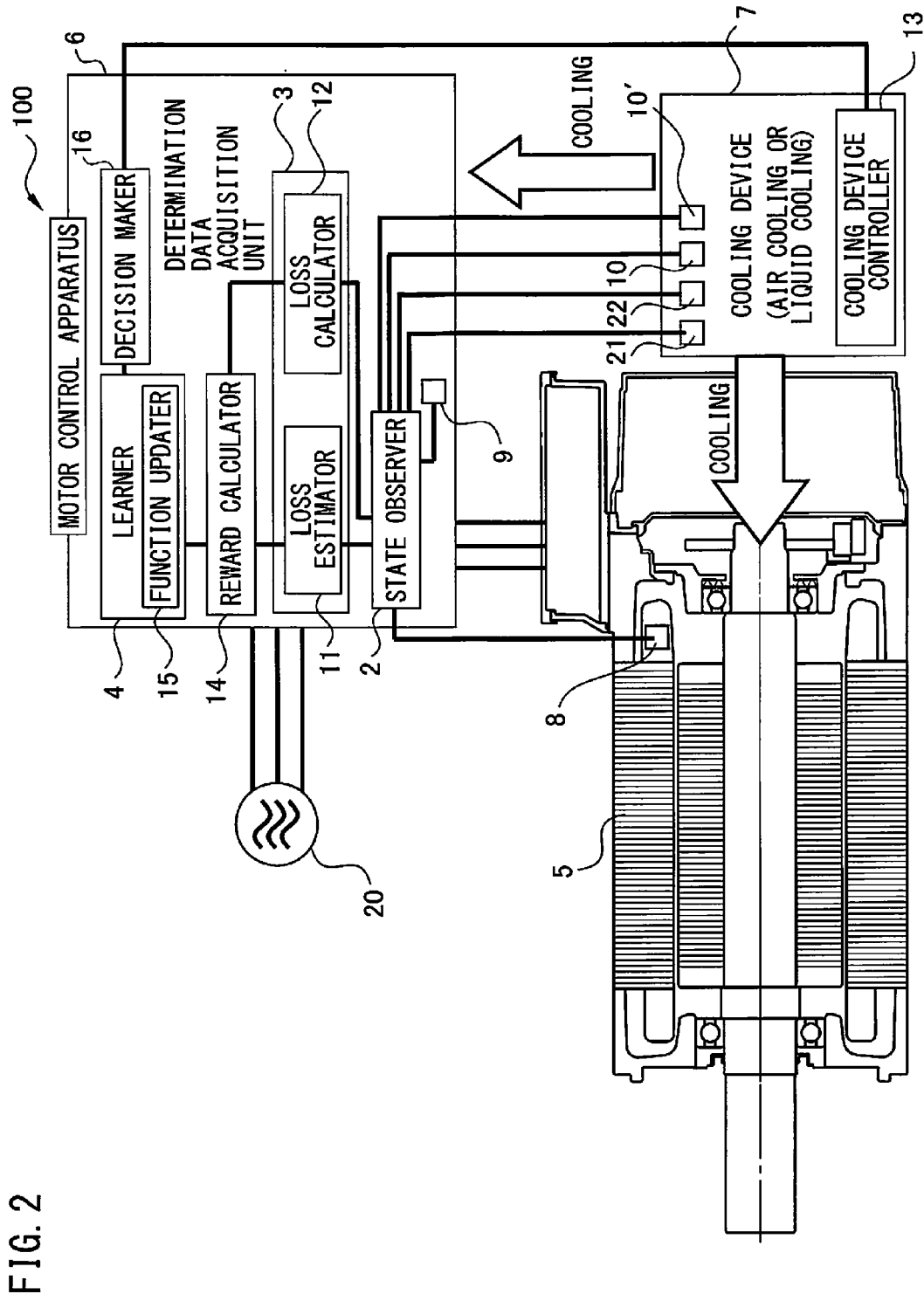
FIG. 2 is a block diagram of a motor control system according to the embodiment of the present invention.
Figure 6:
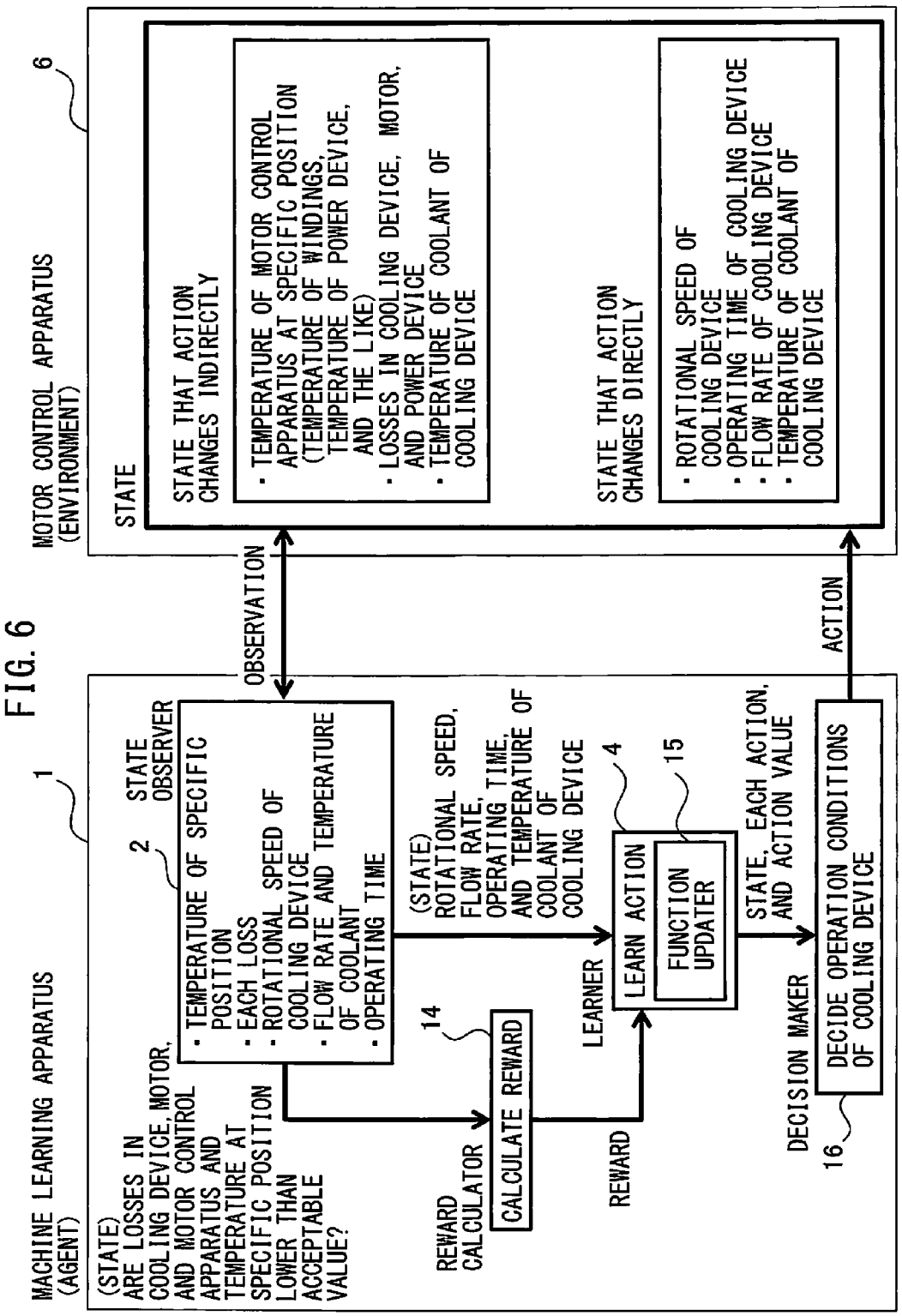
FIG. 6 is a block diagram of a motor control apparatus according to the embodiment of the present invention.

FIG. 1 is a block diagram of a machine learning apparatus according to an embodiment of the present invention. FIG. 2 is a block diagram of a motor control system according to the embodiment of the present invention. FIG. 6 is a block diagram of a motor control apparatus according to the embodiment of the present invention.

A machine learning apparatus 1 according to the embodiment of the present invention, which learns operation conditions of a cooling device 7 for cooling a motor 5 or a motor control apparatus 6, includes a state observer 2, a determination data acquisition unit 3, and a learner 4. The machine learning apparatus may be contained in the motor control apparatus 6 in FIG. 2.

The state observer 2 observes a state variable, which includes temperature data of each of the motor 5 (see FIG. 2) and the motor control apparatus 6 at a specific position, during operation of the cooling device 7.

The determination data acquisition unit 3 acquires determination data for determining a margin of acceptable value of a loss in each of the motor 5, the motor control apparatus 6, and the cooling device 7 and a margin of acceptable value of the temperature of each of the motor 5 and the motor control apparatus 6 at the specific position.

The learner 4 learns the operation conditions of the cooling device 7 in accordance with a training data set, which is constituted of a combination of the state variable and the determination data.

The temperature data includes the temperature of windings of the motor 5 and the temperature of a power device of the motor control apparatus 6 detected by temperature detecting elements (8 and 9) provided in the motor 5 and the motor control apparatus 6, respectively.

The machine learning apparatus 1 preferably further includes a loss estimator 11 for estimating a loss in each of the motor 5 and the motor control apparatus 6 from the temperature data, and a loss calculator 12 for calculating a loss in the cooling device 7 from the operation conditions of the cooling device 7. The loss estimator 11 and the loss calculator 12 may be contained in the determination data acquisition unit 3.

The loss in the cooling device 7 is calculated using the rotational speed and the operating time of the cooling device 7. When cooling is performed using a liquid coolant, the flow rate of the coolant and the temperature of the coolant detected by temperature detecting elements (10 and 10') may be used instead. Note that, the temperature detecting element 10 detects the temperature of the coolant flowing from the motor 5 to the cooling device 7, while the temperature detecting element 10' detects the temperature of the coolant flowing from the cooling device 7 to the motor 5.

Figure 3:
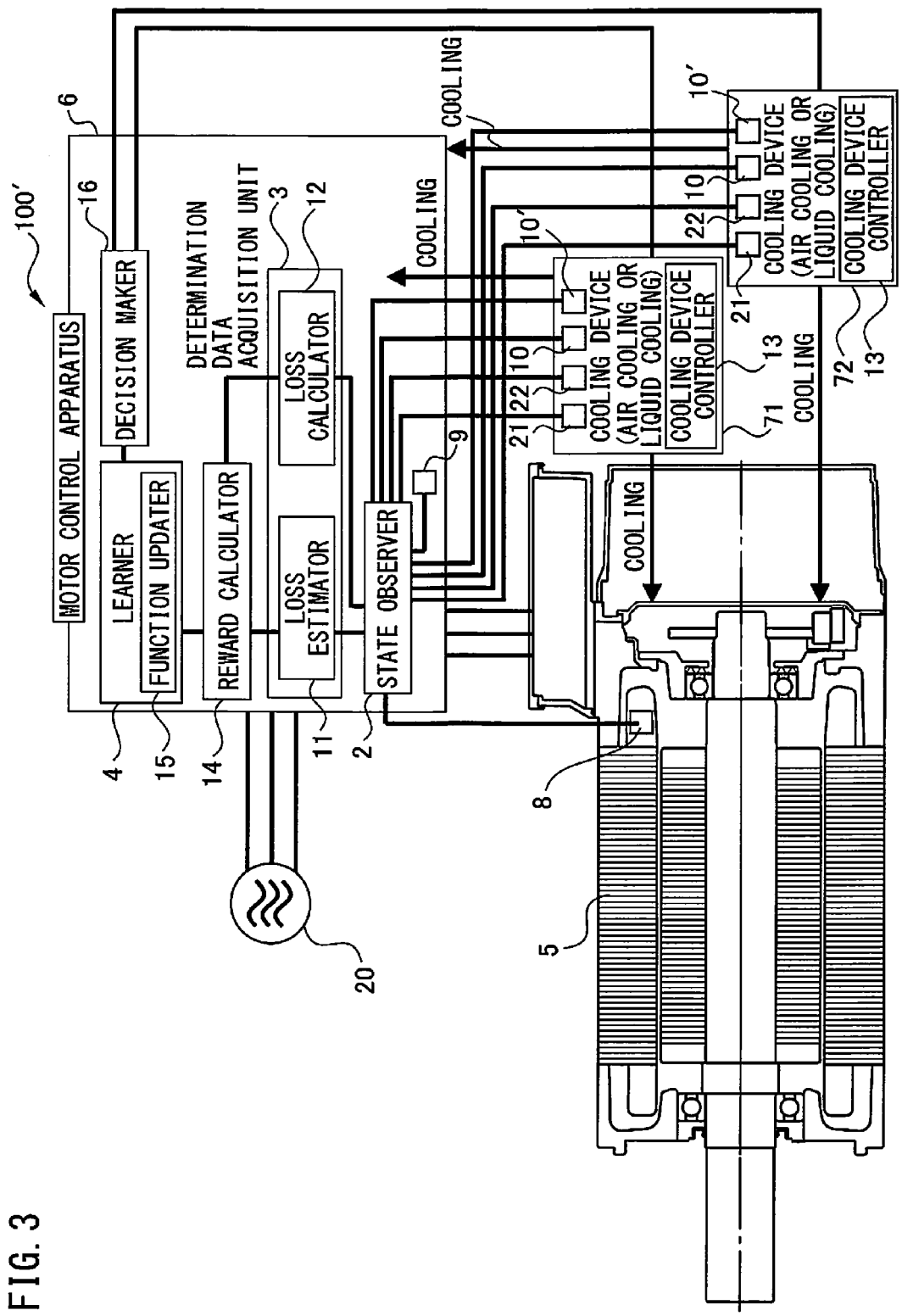
FIG. 3 is a block diagram of a motor control system according to a first alternative example of the embodiment of the present invention.
Figure 4:
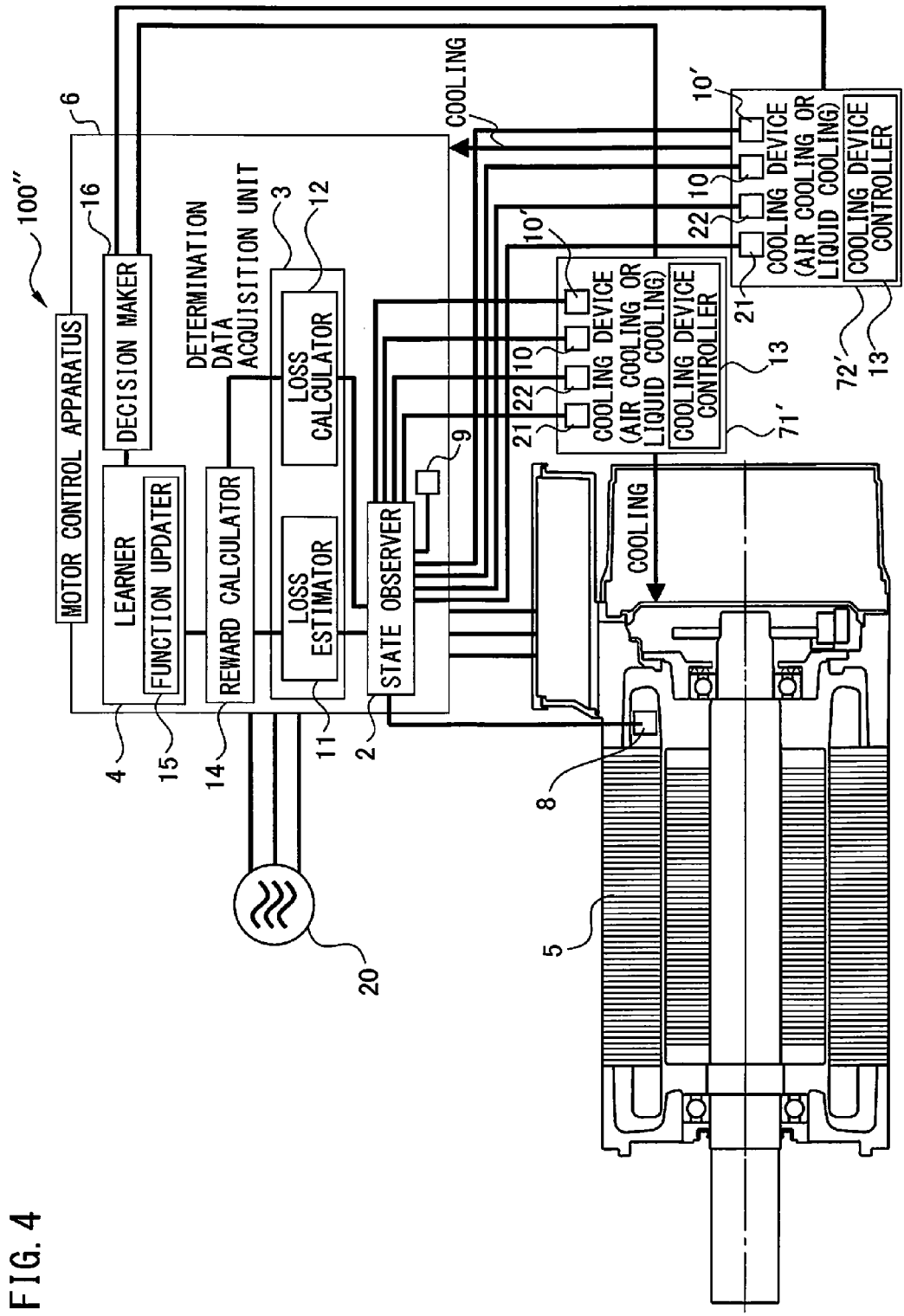
FIG. 4 is a block diagram of a motor control system according to a second alternative example of the embodiment of the present invention.
Figure 5:
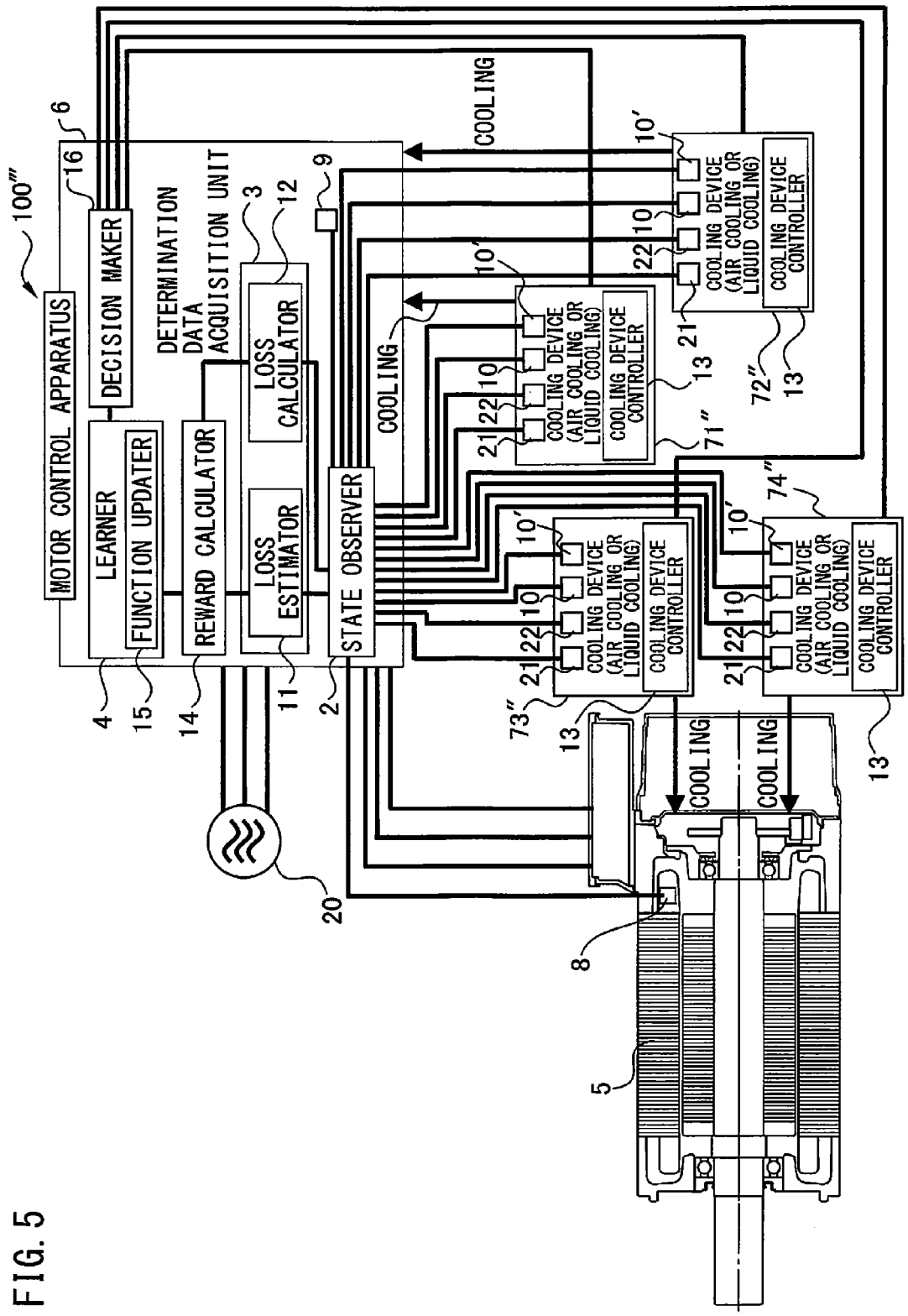
FIG. 5 is a block diagram of a motor control system according to a third alternative example of the embodiment of the present invention.

The motor control system shown in the block diagram of FIG. 2 is provided with only one cooling device by way of example, but is not limited thereto, may be provided with a plurality of cooling devices (FIGS. 3-5).

FIG. 3 is a block diagram of a motor control system 100' according to a first alternative example of the embodiment of the present invention. As shown in FIG. 3, two cooling devices, i.e., a first cooling device 71 and a second cooling device 72, may be provided. Each of the two cooling devices may cool the motor 5 and the motor control apparatus 6.

FIG. 4 is a block diagram of a motor control system 100" according to a second alternative example of the embodiment of the present invention. As shown in FIG. 4, two cooling devices, i.e., a first cooling device 71' and a second cooling device 72', may be provided. The first cooling device 71' may cool the motor 5 and the second cooling device 72' may cool the motor control apparatus 6.

FIG. 5 is a block diagram of a motor control system 100''' according to a third alternative example of the embodiment of the present invention. As shown in FIG. 5, four cooling devices, i.e., a first cooling device 71", a second cooling device 72", a third cooling device 73" and a fourth cooling device 74" may be provided. The first cooling device 71" and the second cooling device 72" may cool the motor 5, and the third cooling device 73" and the fourth cooling device 74" may cool the motor control apparatus 6. The number of the cooling devices is not limited to the example illustrated in FIGS. 3-5. Therefore, three, five or more cooling devices may be provided.

The learner 4 may learn the operation conditions in accordance with training data sets acquired from the plurality of cooling devices.

The motor control apparatus 6 is provided with a reward calculator 14 for calculating a reward based on the determination data. The learner 4 is provided with a function updater 15 that updates a function based on the reward to determine the appropriate operation conditions (rotational speed, operating time, and the like) of the cooling device 7 from the current state variable.

The reward calculator 14 calculates the reward based on the determination data, that is, a result of determining the margin of acceptable value of the sum total of the losses in the motor 5, the motor control apparatus 6, and the cooling device 7 and the margin of acceptable value of the temperature of each of the motor 5 and the motor control apparatus 6 at the specific position.

To be more specific, the reward calculator 14 can calculate the reward based on whether or not the sum total of the losses in the motor 5, the motor control apparatus 6, and the cooling device 7, and the temperature of each of the cooling device 7, the motor 5, and the motor control apparatus 6 at the specific position have margins of acceptable values. For example, when the sum total of the losses in the cooling device 7, the motor 5, and the motor control apparatus 6 decreases with respect to a preceding (immediately preceding) value, and the temperature of each of the cooling device 7, the motor 5, and the motor control apparatus 6 is lower than an acceptable value at the specific position, the reward may be increased in accordance with the margin. When the sum total of the losses in the cooling device 7, the motor 5, and the motor control apparatus 6 increases with respect to the preceding (immediately preceding) value, or the temperature of each of the cooling device 7, the motor 5, and the motor control apparatus 6 is equal to or higher than the acceptable value at the specific position, the reward may be decreased. Note that, in this embodiment, the reward is calculated from the sum total of the losses in the motor 5 and the motor control apparatus 6 in addition to the cooling device 7, by way of example. However, a lower one of the losses in the motor 5 and the motor control apparatus 6 may not be used for the calculation of the reward.

The function updater 15 preferably performs reinforcement learning using so-called Q-learning. The Q-learning is a method for learning a value (action-value) Q(s, a) for selecting an action "a" in a certain environment "s". In a certain state "s", an action having the highest Q(s, a) value is selected as an optimal action. The function updater 15 updates a function (action-value function $Q(s_t, a_t)$) using the following equation (1).

$$Q(s_t, a_t) \leftarrow Q(s_t, a_t) + \alpha\left(r_{t+1} + \gamma \max_a Q(s_{t+1}, a) - Q(s_t, a_t)\right) \quad (1)$$

Here, $Q(s_t, a_t)$ represents the action-value function, $s_t$ represents a state (environment) at a time t, $a_t$ represents an action at the time t, $\alpha$ represents a learning coefficient, $r_{t+1}$ represents a reward, and $\gamma$ represents a discount factor. The action-value function indicates an expected value for the reward. A term with "max" represents the product of a Q value, when an action "a" having the highest Q value is selected in an environment $s_{t+1}$, and $\gamma$.

It is known that the learning coefficient is set at a condition $(0<\alpha)$, and the discount factor is set at a condition $(\gamma \leq 1)$. However, setting both of the learning coefficient and the discount factor at 1, the equation (1) is simplified into the following equation (2).

$$Q(s_t, a_t) \leftarrow r_{t+1} + \gamma \max_a Q(s_{t+1}, a) \quad (2)$$

This update equation indicates that, as compared with the value $Q(s_t, a_t)$ of the action "a" in the environment "s", if an optimal action value $Q(s_{t+1}, \max a_{t+1})$ in the next environmental state by the action "a" is higher, $Q(s_t, a_t)$ is increased. If not, $Q(s_t, a_t)$ is decreased. That is to say, the value of an action in a certain state is approximated to an optimal action value in the next state by the action. The state used in the update equation corresponds to the state variable that can be obtained from the training data set. Also, the reward is obtained from the reward calculator 14. The action represents changing the operation conditions of the cooling device 7, i.e., the rotational speed and the like of the cooling device 7. The action value $Q(s_t, a_t)$ may be stored as, for example, a table for each environment "s" and each action "a" (hereinafter referred to as action value table).

As shown in FIG. 6, the state of the motor control apparatus 6 includes a state that an action changes indirectly and a state that an action changes directly. The state that an action changes indirectly includes the temperature of the motor control apparatus 6 at the specific position (the temperature of the windings, the temperature of the power device, and the like) and the losses in the cooling device 7, the motor 5, and the power device. The state that an action changes directly includes the rotational speed of the cooling device 7 and the operating time of the cooling device 7. Note that, when cooling is performed using a liquid coolant, the state that an action changes indirectly further includes the temperature of the coolant (flowing from the motor 5 to the cooling device 7) of the cooling device 7. The state that an action changes directly further includes the flow rate of the coolant of the cooling device 7 and the temperature of the coolant (flowing from the cooling device 7 to the motor 5) of the cooling device 7.

The learner 4 updates the action value, which corresponds to the current state variable and an action to be taken in the action value table, based on the update equation and the reward.

The learner 4 may update the action value table based on a state variable and a reward of another motor and another motor control apparatus (neither shown) having the same structure as the motor 5 and the motor control apparatus 6.

Next, the motor control apparatus according to the embodiment of the present invention will be described. Note that, this embodiment describes the case of cooling with a liquid coolant. The motor control apparatus 6 according to the embodiment of the present invention includes the above-described machine learning apparatus 1, and further includes a decision maker 16 for issuing a command to change the operation conditions, e.g., the rotational speed of the cooling device 7 based on a result of learning by the learner 4 in accordance with the training data set.

The learner 4 is configured to relearn and update the operation conditions of the cooling device 7 in accordance with an additional training data set, which is constituted of a combination of the current state variable and the determination data.

The machine learning apparatus 1 may be connected to the motor control apparatus 6 through a network, and the state observer 2 may acquire the current state variable through the network.

The machine learning apparatus 1 is preferably present in a cloud server.

The machine learning apparatus 1 may be contained in the motor control apparatus 6 for controlling the motor 5.

A motor control system 100 includes the above-described motor control apparatus 6, the cooling device 7 for cooling the motor 5 and the motor control apparatus 6, and the temperature detecting elements (8, 9, 10, and 10') for outputting temperature data. The motor control apparatus 6 receives alternating-current power from an alternating-current source 20 and drives the motor 5.

The cooling device 7 further includes a cooling device controller 13 for controlling the flow rate and the temperature of the coolant of the cooling device 7. The state observer 2 observes the flow rate and the temperature of the coolant of the cooling device 7. The cooling device 7 further includes a rotational speedometer 21 for detecting the rotational speed of the cooling device 7, and a flowmeter 22 for detecting the flow rate of the coolant of the cooling device 7.

Next, a machine learning method according to the embodiment of the present invention will be described. The machine learning method according to the embodiment of the present invention for learning the operation conditions of the cooling device 7 for cooling the motor 5 or the motor control apparatus 6, includes the steps of observing a state variable including at least one of temperature data of the motor 5 and the motor control apparatus 6 at the specific position during the operation of the cooling device 7; acquiring determination data that determines a margin of acceptable value of a loss in each of the motor 5, the motor control apparatus 6, and the cooling device 7 and a margin of acceptable value of the temperature of each of the motor 5 and the motor control apparatus 6 at the specific position; and learning the operation conditions of the cooling device 7 in accordance with a training data set constituted of a combination of the state variable and the determination data.

Figure 7:
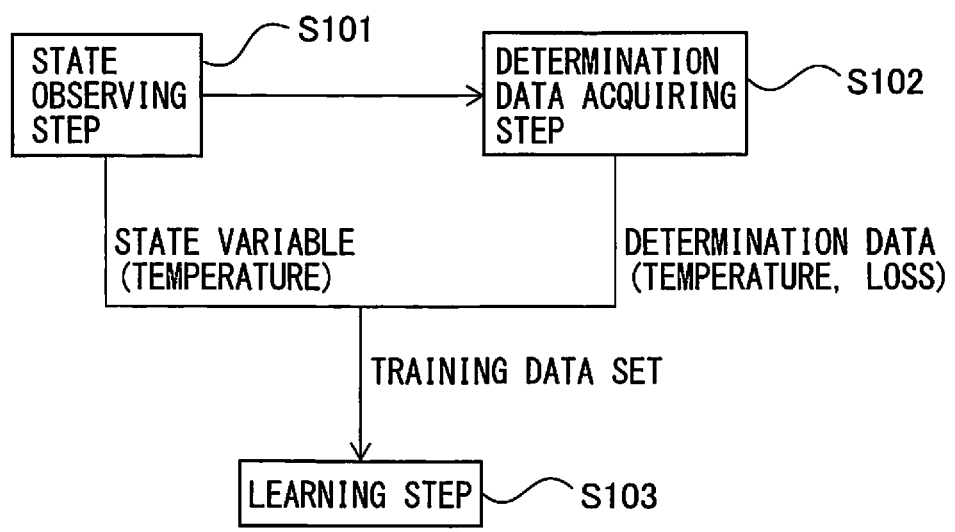
FIG. 7 is a flowchart for explaining an operation process of the machine learning apparatus according to the embodiment of the present invention.

FIG. 7 is a flowchart for explaining the operation of the machine learning apparatus according to the embodiment of the present invention. First, in step S101, a state variable, which includes at least one of the temperature data of the motor 5 and the motor control apparatus 6 at the specific position, is observed during the operation of the cooling device 7.

Next, in step S102, determination data that determines a margin of acceptable value of a loss in each of the motor 5, the motor control apparatus 6, and the cooling device 7 and a margin of acceptable value of the temperature of each of the motor 5 and the motor control apparatus 6 at the specific position is acquired.

Next, in step S103, the operation conditions of the cooling device 7 are learned in accordance with a training data set that is constituted of a combination of the state variable and the determination data.

Figure 8:
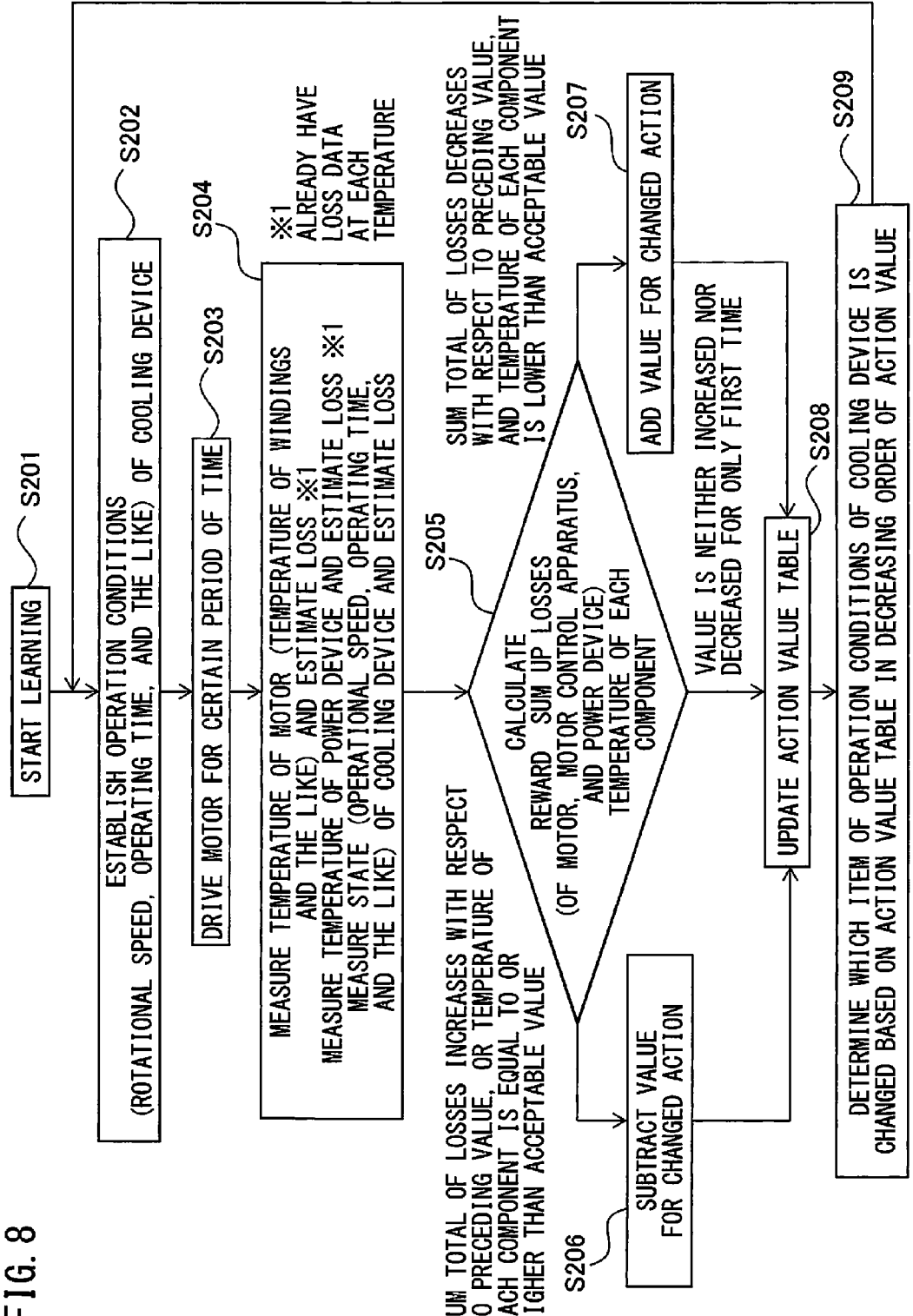
FIG. 8 is a flowchart for explaining an operation process of the motor control system according to the embodiment of the present invention.

Next, a machine learning method using the motor control system according to the embodiment of the present invention will be described. FIG. 8 is a flowchart for explaining the operation of the motor control system according to the embodiment of the present invention. First, learning is started in step S201.

Next, operation conditions (rotational speed, operating time, and the like) are set in the cooling device 7 in step S202.

Next, in step S203, the motor 5 is operated for a certain period of time.

Next, in step S204, the temperature of the motor 5 (the temperature of the windings and the like) is measured, and the loss estimator 11 estimates a loss. Furthermore, the temperature of the power device of the motor control apparatus 6 is measured, and the loss estimator 11 estimates a loss. Furthermore, the state (the rotational speed, the operating time, and the like) of the cooling device 7 is measured, and the loss calculator 12 calculates a loss. The loss estimator 11 has already had loss data at each temperature.

Next, in step S205, a reward is calculated based on the total sum of the losses (of the motor, the cooling device, and the power device) and the temperature of each component.

When the total sum of the losses increases as compared with the preceding value or the temperature of each component is equal to or higher than an acceptable value, in step S206, a changed action value is decreased. After that, in step S208, the action value table is updated.

On the other hand, when the total sum of the losses decreases as compared with the preceding value and the temperature of each component is lower than the acceptable value, in step S207, the changed action value is increased. After that, in step S208, the action value table is updated.

However, in step S208, the action value table is updated on the condition that the value is neither increased nor decreased for only the first time.

Next, in step S209, which item of the operation conditions of the cooling device 7 to be changed is determined in decreasing order of the action value based on the action value table.

Returning to step S202, the cooling device 7 is operated with an optimal action value, based on the operation conditions of the cooling device 7 determined in step S209.

As described above, according to the machine learning apparatus, the motor control apparatus and the motor control system having the machine learning apparatus, and the machine learning method according to the embodiment of the present invention, it is possible to reduce a loss in each of the motor, the motor control apparatus, and the cooling device, while controlling each of the motor and the motor control apparatus at a regulated temperature or lower by the machine learning.

According to the present invention, it is possible to provide the machine learning apparatus that can reduce the sum total of the losses in the motor, the motor control apparatus, and the cooling device by the machine learning, the motor control apparatus and the motor control system having the machine learning apparatus, and the machine learning method.

What is claimed is:

1. A machine learning apparatus for learning an operation condition of a cooling device for cooling a motor or a motor control apparatus, comprising:
   a state observer for observing a state variable including at least one of temperature data of the motor and the motor control apparatus at a specific position during operation of the cooling device;
   a determination data acquisition unit for acquiring determination data that determines a margin of acceptable value of a loss in each of the motor, the motor control apparatus, and the cooling device and a margin of acceptable value of the temperature of each of the motor and the motor control apparatus at the specific position; and
   a learner for learning the operation condition of the cooling device in accordance with a training data set constituted of a combination of the state variable and the determination data, wherein
   the learner includes:
      a reward calculator for calculating a reward based on the determination data; and
      a function updater for updating, based on the reward, a function to estimate at least one of a combination of a rotational speed and an operating time of the cooling device and a combination of a temperature and a flow rate of a coolant of the cooling device that are optimal to reduce the sum total of at least one of the losses in the motor and the motor control apparatus and the loss in the cooling device from the current state variable.

2. The machine learning apparatus according to claim 1, wherein the temperature data includes at least one of the temperature of a winding of the motor and the temperature of a power device of the motor control apparatus detected by temperature detecting elements provided in the motor and the motor control apparatus, respectively.

3. The machine learning apparatus according to claim 1, further comprising:
   a loss estimator for estimating a loss in each of the motor and the motor control apparatus from the temperature data; and
   a loss calculator for calculating a loss in the cooling device from the operation condition of the cooling device.

4. The machine learning apparatus according to claim 1, wherein the loss in the cooling device is calculated using at least one of a combination of a rotational speed and an operating time of the cooling device and a combination of a temperature and a flow rate of a coolant of the cooling device.

5. The machine learning apparatus according to claim 1, wherein the learner is configured to learn the operation condition in accordance with training data sets acquired on a plurality of cooling devices.

6. The machine learning apparatus according to, claim 1, wherein the learner updates an action value table that corresponds to at least one of the combination of the rotational speed and the operating time of the cooling device and the combination of the temperature and the flow rate of the coolant of the cooling device, based on the state variable of at least one of the motor and the motor control apparatus, and the reward.

7. The machine learning apparatus according to claim 6, wherein the reward calculator calculates the reward based on the margin of acceptable value of the sum total of the loss in the cooling device and at least one of copper and iron losses of the motor and a loss in a power device of the motor control apparatus, or the margin of acceptable value of the temperature of each of the motor and the motor control apparatus at the specific position.

8. The machine learning apparatus according to claim 1, wherein the learner updates an action value table based on a state variable of another motor or motor control apparatus identical to the motor or motor control apparatus and the reward, and the action value table corresponds to at least one of a combination of a rotational speed and an operating time of another cooling device to cool the identical motor or motor control apparatus and a combination of a temperature and a flow rate of a coolant of the cooling device.

9. A motor control apparatus including the machine learning apparatus according to claim 1, further comprising:
a decision maker for determining a command value for at least one of a combination of a rotational speed and an operating time of the cooling device and a combination of a temperature and a flow rate of a coolant of the cooling device, based on a result of learning by the learner in accordance with the training data set.

10. The motor control apparatus according to claim 9, wherein the learner is configured to relearn and update the operation condition in accordance with an additional training data set constituted of a combination of the current state variable and the determination data.

11. The motor control apparatus according to claim 9, wherein
the machine learning apparatus is connected to the motor control apparatus through a network; and
the state observer is configured to acquire the current state variable through the network.

12. The motor control apparatus according to claim 11, wherein the machine learning apparatus is present in a cloud server.

13. The motor control apparatus according to claim 9, wherein the machine learning apparatus is contained in the motor control apparatus for controlling the motor.

14. A motor control system comprising:
the motor control apparatus according to claim 9;
a cooling device for cooling the motor or the motor control apparatus; and
a temperature detecting element for outputting the temperature data.

15. The motor control system according to claim 14, wherein
the cooling device further includes a cooling device controller for controlling the flow rate and the temperature of the coolant of the cooling device; and
the state observer observes the flow rate and the temperature of the coolant of the cooling device.

16. A machine learning method for learning the operation condition of a cooling device for cooling a motor or a motor control apparatus, comprising the steps of:
observing a state variable including at least one of temperature data of the motor and the motor control apparatus at a specific position during operation of the cooling device;
acquiring determination data for determining a margin of acceptable value of a loss in each of the motor, the motor control apparatus, and the cooling device and a margin of acceptable value of the temperature at each of the specific positions; and
learning the operation condition of the cooling device in accordance with a training data set constituted of the state variable and the determination data, wherein
said learning includes:
calculating a reward based on the determination data; and
updating, based on the reward, a function to estimate at least one of a combination of a rotational speed and an operating time of the cooling device and a combination of a temperature and a flow rate of a coolant of the cooling device that are optimal to reduce the sum total of at least one of the losses in the motor and the motor control apparatus and the loss in the cooling device from the current state variable.

* * * * *